(12) United States Patent
Malin et al.

(10) Patent No.: US 10,296,552 B1
(45) Date of Patent: May 21, 2019

(54) SYSTEM AND METHOD FOR AUTOMATED IDENTIFICATION OF INTERNET ADVERTISING AND CREATING RULES FOR BLOCKING OF INTERNET ADVERTISING

(71) Applicant: NOVNIFY LIMITED, Nicosia (CY)

(72) Inventors: Pavlo Malin, Zaporizhzhia (UA); Oleksandr Chalyi, Pryluky (UA); Oleksii Zinziuk, Kiev (UA); Volodymyr Shelest, Kiev (UA); Ivan Slieptsov, Kremennaya (UA)

(73) Assignee: FiaLEAF LIMITED, Nicosia (CY)

( * ) Notice: Subject to any disclaimer, the term of this patent is extended or adjusted under 35 U.S.C. 154(b) by 0 days.

(21) Appl. No.: 16/024,779

(22) Filed: Jun. 30, 2018

(51) Int. Cl.
*G06K 9/00* (2006.01)
*G06F 16/957* (2019.01)
*G06F 17/22* (2006.01)
*G06K 9/62* (2006.01)
*G06F 16/951* (2019.01)
*G06F 16/958* (2019.01)

(52) U.S. Cl.
CPC ......... *G06F 16/957* (2019.01); *G06F 16/951* (2019.01); *G06F 16/986* (2019.01); *G06F 17/2247* (2013.01); *G06K 9/6267* (2013.01)

(58) Field of Classification Search
None
See application file for complete search history.

(56) References Cited

U.S. PATENT DOCUMENTS

| | | | | |
|---|---|---|---|---|
| 7,080,073 | B1* | 7/2006 | Jiang | G06F 17/2229 |
| 7,840,502 | B2* | 11/2010 | Li | G06Q 30/0277 |
| | | | | 706/12 |
| 8,745,753 | B1* | 6/2014 | Gottlieb | G06Q 30/0277 |
| | | | | 726/26 |
| 9,294,727 | B2* | 3/2016 | Steelberg | G06Q 30/02 |
| 2008/0109306 | A1* | 5/2008 | Maigret | G06F 21/10 |
| | | | | 705/14.46 |
| 2009/0119268 | A1* | 5/2009 | Bandaru | G06F 17/2745 |
| | | | | 705/7.12 |
| 2009/0248707 | A1* | 10/2009 | Mehta | G06F 17/212 |
| 2009/0292984 | A1* | 11/2009 | Bauchot | G06Q 30/02 |
| | | | | 715/234 |
| 2009/0327849 | A1* | 12/2009 | Kavanagh | G06Q 10/107 |
| | | | | 715/205 |
| 2010/0094860 | A1* | 4/2010 | Lin | G06Q 30/02 |
| | | | | 707/709 |
| 2010/0153219 | A1* | 6/2010 | Mei | G06F 17/27 |
| | | | | 705/14.73 |

(Continued)

*Primary Examiner* — Shervin K Nakhjavan
(74) *Attorney, Agent, or Firm* — Inventa Capital PLC

(57) ABSTRACT

The system allows identifying new Internet advertising with minimal human participation. Also, the system provides a module for heuristic generation of rules for the found advertising, which makes it possible to automate the process of maintaining the relevance of lists of Internet advertising blocking rules. The system can operate in two modes: the mode of finding new advertising and generating rules for it and the mode of automatic data collection (datasets) for learning. The distinctive feature of the system is a comprehensive approach to the analysis of ad units that includes visual appearance of images (color contrast, element layout patterns, etc.), link analysis, and html code analysis.

16 Claims, 2 Drawing Sheets

(56) References Cited

U.S. PATENT DOCUMENTS

| | | | |
|---|---|---|---|
| 2010/0185513 A1* | 7/2010 | Anderson | G06Q 30/02 705/14.49 |
| 2011/0035274 A1* | 2/2011 | Goel | G06Q 30/02 705/14.45 |
| 2011/0035345 A1* | 2/2011 | Duan | G06K 9/6256 706/12 |
| 2011/0078487 A1* | 3/2011 | Nielsen | G06Q 30/02 714/2 |
| 2013/0103667 A1* | 4/2013 | Minh | H04L 51/32 707/709 |
| 2013/0117110 A1* | 5/2013 | Wu | G06O 30/02 705/14.54 |
| 2013/0191723 A1* | 7/2013 | Pappas | G06F 17/2247 715/234 |
| 2014/0129352 A1* | 5/2014 | Ringdahl | G06Q 30/0275 705/14.71 |
| 2014/0207559 A1* | 7/2014 | McCord | G06Q 30/0242 705/14.41 |
| 2014/0229271 A1* | 8/2014 | Clapp | G06Q 30/0245 705/14.44 |
| 2015/0112963 A1* | 4/2015 | Mojtahedi | G06F 16/9537 707/711 |
| 2015/0278853 A1* | 10/2015 | McLaughlin | G06F 16/951 705/14.47 |
| 2016/0335353 A1* | 11/2016 | Gianos | G06F 16/951 |
| 2017/0345075 A1* | 11/2017 | Khandelwal | G06Q 30/0623 |
| 2018/0174219 A1* | 6/2018 | Jadhav | G06Q 30/0631 |

* cited by examiner

SYSTEM AND METHOD FOR AUTOMATED IDENTIFICATION OF INTERNET ADVERTISING AND CREATING RULES FOR BLOCKING OF INTERNET ADVERTISING

FIELD OF THE INVENTION

The present invention relates to system and method for generating rules for blocking unwanted network advertising.

BRIEF DESCRIPTION OF THE INVENTION

The art is replete with various methods and systems for managing an advertisement and, more particularly, methods and systems for providing such management using self-learning, such as with artificial intelligence.

With the popularity and development of the Internet, more and more users have become accustomed to browsing the Web on such as a mobile phone, tablet computer terminal equipment, access to information. However, users in the enjoyment of the above series of convenient, web advertising followed by more and more, such as banner ads, button ads, pop-up ads, pages suspension and interstitial ads and so on. For users with mobile phones and other mobile terminals browsing the web, in the case of display screen space is limited, these web advertising will not only affect access to information, but also consumes network traffic. Therefore, how to effectively filter the Web page advertising industry is studying the problem solved.

Ad filtering method currently widely used primarily to use filtering software to filter advertising, such as AdBlock, net nets and other masters. Use ad filtering software can be filtered in the form of a Web page banners, popups, video ads, etc., to meet user demand for filters to a certain extent.

One of the prior art references is United States Patent Publication No. 20090276309, which teaches a self-learning computer-based system for managing an advertisement, including a memory element for at least one specially-programmed general purpose computer for storing an artificial intelligence program (AIP) and a plurality of advertisements for at least one good or service offered by a first business entity. The system also includes an interface element for the at least one specially programmed general-purpose computer and a processor for the at least one specially programmed general-purpose computer for identifying a customer. The processor is for selecting an advertisement from the plurality of advertisements, using the AIP and the customer identification, and the interface element is for transmitting the selected advertisement.

Another prior art reference, such as Chinese Patent Application No. CN106682677A teaches an advertising identification rule induction method, device and equipment (the system). The system includes a training set is generated based on a first URL's List; according to the identification result by manual work and/or by advertising recognition software. Each element in the training set is labeled as an advertising element or non-advertising element; through the machine learning algorithm, an advertising recognition model is obtained based on the advertising recognition characteristics of each element in the training set and the judgment whether or not the characteristics are the labeled results of the advertising elements. The testing set is generated based on a second URL's List; based on the advertising recognition characteristics of each element in the testing set. The centralized advertising elements are identified and tested using the advertising recognition model; an advertising identification rule is obtained by carrying out induction on uniform resource locators of the advertising elements in the test set. By this time, a new advertising identification rule can be used to identify advertising elements in a page, or the new advertising identification rule and the manual labeling rule/advertising identification rule of advertising identification software can be combined to identify the advertising elements in the page.

Still another prior art reference is "Content Aware Ad Blocker", developed by UC Berkeley Masters of Information and Data Science Capstone Project. This Content Aware Ad Blocker is based on so called "On-the-fly" ad blocking using machine learning techniques. To the extent effective, this Content Aware Ad Blocker has drawbacks such as use of only URL and analysis of js-scripts as data. The other drawback of this system is use of block ads on the fly without generating the rules.

Still another prior art reference is "Cloud Vision API", developed by Google. This system can classify some images as Internet advertising (classes 'banners', 'advertising') by visual representation, but the accuracy is not high since this system was designed as a multiclass classification, without specialization in recognition of advertising. Also, this system does not provide functions for the collection of images and data and does not take into account HTML or URL.

For the correct blocking of advertising, most ad blockers use ad blocking rules—it is a template data format commonly used in the industry, which includes elements such as blocks, links, scripts, etc. and predetermined rules on what needs to be blocked and on what web pages. Since advertising is often updated (new ad networks appear, ad units change their location)—very important task for all adblockers) is to maintain the list of rules in the current state. In most cases, this task of maintaining the relevance of the list of rules is performed by human, which has major drawbacks such as human productivity and limitation of it and the speed of response to new advertising.

To the extent as being effective, there is always a need for new and improved systems and methods for blocking and filtering of network advertising.

It would therefore be desirable to have a method for blocking network advertising offer improved systems for detecting and blocking undesirable internet-based advertisements.

There is a need for new and improved system and method, which will allow automating the task of maintaining the relevance of the rules for blocking advertising.

The present invention aims to solve this problem by simple and convenient means.

SUMMARY OF THE INVENTION

A computer-implemented system for heuristic generation of rules for web-based advertising received from a web in form of full content of web pages, wherein the computer-implemented system is configured to automatically finding new web-based advertising and generating rules for the web-based advertising and automatically collecting data. The computer-implemented system includes at least one crawler bot including a combination of a computer, a web-browser, and a browser extension and tools for monitoring and managing the at least one crawler bots, wherein the browser extension is adaptable for automatic deployment. There is at least one crawler bot is used to collect a report including a screenshot of the entire web page stored as a normal image in jpg format and a copy of a page of a DOM tree element, including child elements of the DOM tree element with related links (url) and html metrics. Those skilled in the art will appreciate that any other formats for capturing and saving images and other graphical elements maybe used and the jpg format used herein is not intended to limit the scope of the present invention.

The computer-implemented system includes a bot server module for collecting and storing data received from the at least one crawler bot and coordinating functionality of the at least one crawler bot. The computer-implemented system includes a report cutter module adaptable to receive the report wherein an original image of the web page is cut into parts that correspond to visual elements of the web page are stored in a database.

The computer-implemented system includes a report analyzer module wherein each of the DOM tree elements with assigned identifier of the cut image is sent for classification to a heuristic ads classifier module and an attribute received from the heuristic ads classifier module is appended to each checked element, whether it is supposedly an advertising or not.

The computer-implemented system is configured to automatically find new web-based advertising and generating rules for the web-based advertising and automatically collecting data through a module for issue system review wherein the reports are confirmed and submitted to a module for issue system and rules generation to develop preliminary lists of rules generated for each ad unit of the report, wherein preliminary rule lists are created by a heuristic rules generator module for generating rules for each ad unit based on html attributes including and not limited to id, class, href, src, taking into account the priority order of each said html attributes.

The computer-implemented system includes an error learning module interconnecting the module for issue system review and said heuristic ads classifier module. The report cutter module is configured to establish a link between the elements in the DOM tree of the web page with respective html content and a visual display on the original web page, wherein cut-out images are saved in the database, and an identifier (ID) is assigned to each of the cut-out images, after which the data of the ID of each of the cut-out images is added to the DOM tree thereby establishing a link between the cut-out image and the DOM tree.

The report cutter module is also configured to identify elements that contain at least one external link, wherein the one external link includes a domain which does not contain domain name of the site on which it was found. The least one crawler bot also includes a modified Ad blocking browser extension is added thereto. Those skilled in the art will appreciate that extensions maybe added thereto without limiting the scope of the present invention. This modified Ad blocking browser extension is configured not to block the advertising found on the web page, but instead configured only to mark the units that would have been blocked, wherein the marks are stored in the nodes of the DOM tree. The report cutter module is configured not to perform pre-filtering in the mode of new advertising search wherein all the units that were contained on the web page pass to the further processing.

A computer-implemented method for heuristic generation of rules for web-based advertising received from a web in form of full content of web pages, the computer-implemented method configured to automatically find new web-based advertising and generate rules for the web-based advertising and automatically collecting data. The computer-implemented method includes the step of operably connecting at least one crawler bot module with a bot server module and a report cutter module followed by the step of operably communicating at least one crawler bot module with a separate computer, a web-browser, and a browser extension and tools for monitoring and managing said at least one crawler bots, wherein the browser extension adaptable for automatic deployment.

The method further includes the step of configuring the at least one crawler bot to collect a report including a screenshot of the entire web page stored as a normal image format and a copy of a page of a DOM tree element, including child elements of the DOM tree element with related links (url) and html metrics. The method includes the step of collecting and storing by the bot server module data received from the at least one crawler bot and coordinating functionality of the at least one crawler bot followed by the step of receiving by the report cutter module the report wherein an original image of the web page is cut into parts that correspond to visual elements of the web page are stored in the database.

The method includes the step of operably connecting a report analyzer module with the report cutter module and a heuristic ads classifier module wherein each of the DOM tree elements with assigned identifier of the cut image is sent for classification to the heuristic ads classifier module and an attribute received from the heuristic ads classifier module is appended to each checked element, whether it is supposedly an advertising or not.

The method further includes the step of configuring the computer-implemented system to automatically finding new web-based advertising and to generate rules for the web-based advertising and automatically collect data through a module for issue system review wherein the reports are confirmed. The method further includes the step of submitting to a module for issue system and rules generation to develop preliminary lists of rules generated for each ad unit of the report, wherein preliminary rule lists are created by a heuristic rules generator module to generate rules for each ad unit based on html attributes including and not limited to id, class, href, src, taking into account the priority order of each the html attributes.

The method further includes a step of interconnecting an error learning module with the module for issue system review and the heuristic ads classifier module. The method includes a step of configuring the report cutter module to establish a link between the elements in the DOM tree of the web page with respective html content and visual display on the original web page followed by a step of saving cut-out images in the database and assigning an identifier (ID) to each of the cut-out images, after which the data of the ID of each of the cut-out images is added to the DOM tree to establish a link between the cut-out image and the DOM tree.

The method includes a step of configuring the report cutter module to identify elements that contain at least one external link, wherein the one external link includes a domain which does not contain domain name of the site on which it was found. The method includes a step of adding to the at least one crawler bot a modified Ad blocking browser extension and configuring the modified Ad blocking browser extension not to block the advertising found on the web page, but instead configuring modified Ad blocking browser extension only to mark the units that would have been blocked, wherein the marks are stored in the nodes of the DOM tree. The method includes a step of configuring the report cutter module not to perform pre-filtering in the mode of new advertising search wherein all the units that were contained on the web page pass to the further processing.

The system allows identifying new Internet advertising with minimal human participation. Also, the system provides a module for heuristic generation of rules for the found advertising, which makes it possible to automate the process of maintaining the relevance of lists of Internet advertising blocking rules. The system can operate in two modes: the mode of finding new advertising and generating rules for it and the mode of automatic data collection (datasets) for learning.

The distinctive feature of the system is the use of visual differences between advertising images (color contrast, element layout patterns, etc.) and non-advertising ones for their automatic classification. The use of modern methods of machine learning to recognize (classify) images together with heuristic modules for finding ad markers in HTML elements and in URL allows achieving high accuracy in the identification of advertising elements on a web page. This system provides the full functionality necessary for automatic visits of web pages, analyzing their content (search of ad units): the system for checking the found advertising and its corrections, the system for generating rules for the found ad units and the system of learning on the processed data. This tool allows to fully close the task cycle "automatic identification of advertising on the Internet".

An advantage of the present invention is to provide system and method using visual differences between advertising images (color contrast, element layout patterns, etc.) and non-advertising ones for their automatic classification.

Another advantage of the present invention is to provide system and method using modern methods of machine learning to recognize (classify) images together with heuristic modules for finding ad markers in HTML elements and in URL allows achieving high accuracy in the identification of advertising elements on a web page.

Still another advantage of the present invention is to provide system and method using the full functionality necessary for automatic visits of web pages, analyzing their content (search of ad units).

Still another advantage of the present invention is to provide system and method for checking the found advertising and its corrections and generating rules for the found ad units and the system of learning on the processed data.

Still another advantage of the present invention is to provide a system operating in two modes, i.e. the mode of finding new advertising and generating rules for it and the mode of automatic data collection (datasets) for learning.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
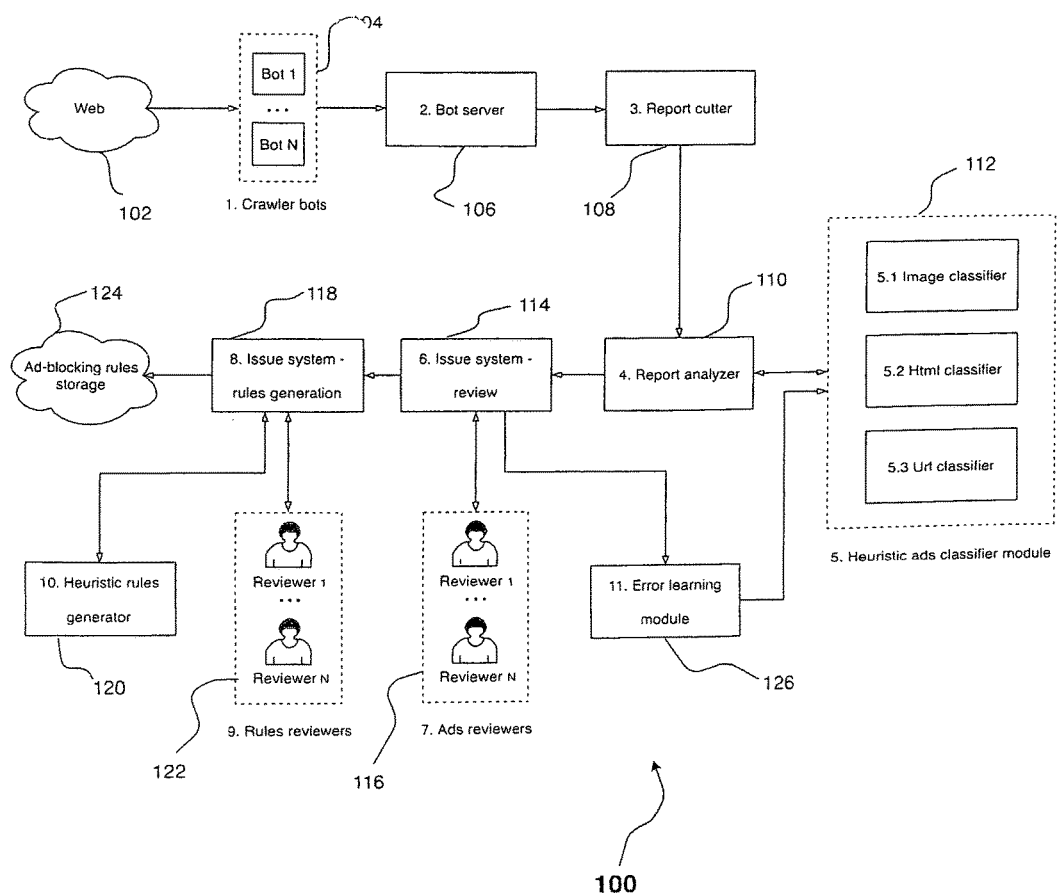
FIG. 1 illustrates a schematic view of system of the present invention operating in a first mode directed to finding new advertising and generating rules for it.
Figure 2:
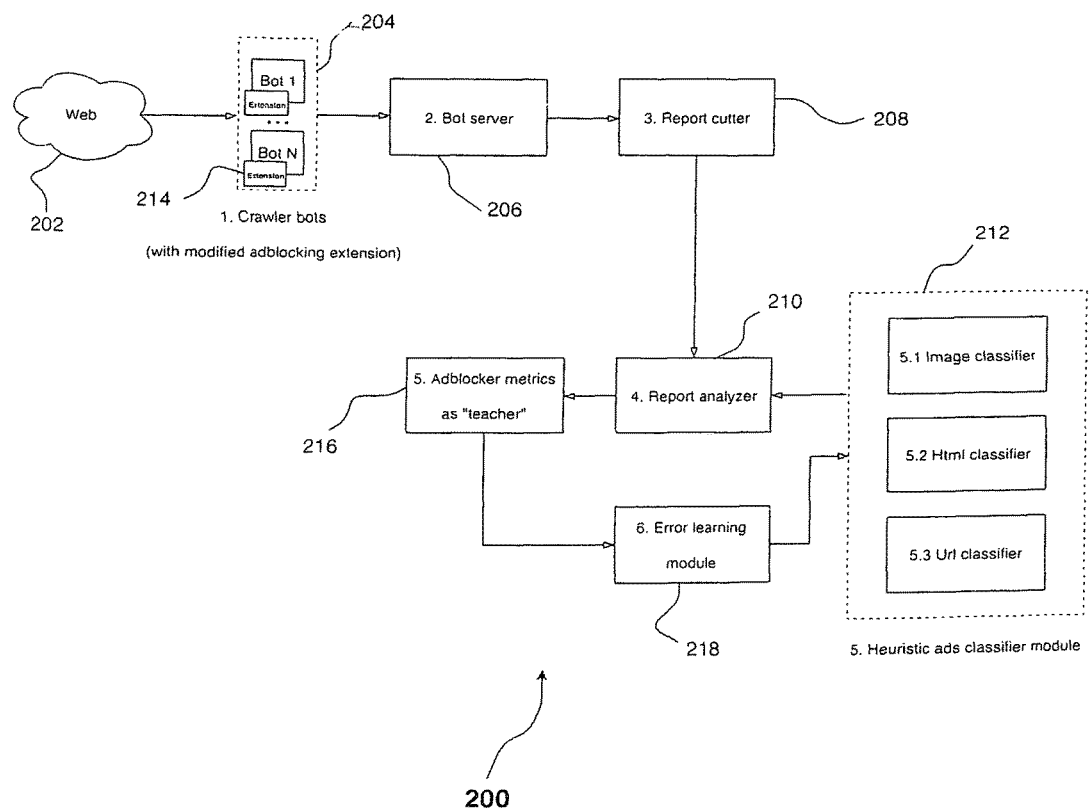
FIG. 2 illustrates a schematic view of system of the present invention operating in a second mode directed to automatic data collection (datasets) for learning.

Referring to the Figures, wherein like numerals indicate like or corresponding parts, FIG. 1 illustrates a schematic view of method of the present invention operating in a first mode directed to finding new advertising and generating rules for it, generally shown at 100. FIG. 2 illustrates a schematic view of method of the present invention operating in a second mode directed to automatic data collection (datasets) for learning, generally shown at 200.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring back to FIG. 1, the schematic view of the system 100 of the present invention operating in a first mode directed to finding new advertising and generating rules for it. The system 100 allows identifying new Internet advertising with minimal human participation. Also, the system 100 provides a module for heuristic generation of rules for the found advertising, which makes it possible to automate the process of maintaining the relevance of lists of Internet advertising blocking rules.

The computer-implemented system 100 for heuristic generation of rules for web-based advertising received from a web 102 in form of full content of web pages, wherein the computer-implemented system is configured to automatically finding new web-based advertising and generating rules for the web-based advertising and automatically collecting data. The computer-implemented system 100 includes at least one crawler bot module 104 presented a combination of a separate computer, a web-browser, and a browser extension and tools for monitoring and managing the at least one crawler bots, wherein the browser extension is adaptable for automatic deployment.

The at least one crawler bot module 104 is used to collect a report including a screenshot of the entire web page stored as a normal image in jpg format and a copy of a page of a DOM tree element, including child elements of the DOM tree element with related links (url) and html metrics. Those skilled in the art will appreciate that any other formats for capturing and saving images and other graphical elements maybe used and the jpg format used herein is not intended to limit the scope of the present invention. The computer-implemented system 100 includes a bot server module 106 for collecting and storing data received from the at least one crawler bot module 104 and coordinating functionality of the at least one crawler bot module 104. The computer-implemented system 100 includes a report cutter module 108 adaptable to receive the report wherein an original image of the web page is cut into parts that correspond to visual elements of the web page are stored in a database.

The computer-implemented system 100 includes a report analyzer module 110 wherein each of the DOM tree elements with assigned identifier of the cut image is sent for classification to a heuristic ads classifier module 112 and an attribute received from the heuristic ads classifier module 112 is appended to each checked element, whether it is supposedly an advertising or not.

The computer-implemented system 100 is configured to automatically find new web-based advertising and generating rules for the web-based advertising and automatically collecting data through a module for issue system review 114 wherein the reports are confirmed and submitted to a module for issue system and rules generation 118 to develop preliminary lists of rules generated for each ad unit of the report, wherein preliminary rule lists are created by a heuristic rules generator module 120 for generating rules for each ad unit based on html attributes including and not limited to id, class, href, src, taking into account the priority order of each said html attributes.

The computer-implemented system 100 includes an error learning module 126 interconnecting the module for issue system review 114 and the heuristic ads classifier module 112. The report cutter module 108 is configured to establish a link between the elements in the DOM tree of the web page with respective html content and visual display on the original web page, wherein cut-out images are saved in the database, and an identifier (ID) is assigned to each of the cut-out images, after which the data of the ID of each of the cut-out images is added to the DOM tree thereby establishing a link between the cut-out image and the DOM tree.

The report cutter module 108 is also configured to identify elements that contain at least one external link, wherein the one external link includes a domain which does not contain domain name of the site on which it was found.

Referring to FIG. 2, an alternative embodiment of the present system is shown. All modules function in a similar function, as described above. The computer-implemented system 200 for heuristic generation of rules for web-based advertising received from a web 202 in form of full content of web pages, wherein the computer-implemented system is configured to automatically finding new web-based advertising and generating rules for the web-based advertising and automatically collecting data. The computer-implemented system 200 includes at least one crawler bot module 204 presented a combination of a computer, a web-browser, and a browser extension and tools for monitoring and managing the at least one crawler bots, wherein the browser extension is adaptable for automatic deployment. The at least one crawler bot module 204 is used to collect a report including a screenshot of the entire web page stored as a normal image format and a copy of a page of a DOM tree element, including child elements of the DOM tree element with related links (url) and html metrics. The computer-implemented system 200 includes a bot server module 206 for collecting and storing data received from the at least one crawler bot module 204 and coordinating functionality of the at least one crawler bot module 204. A report cutter module 208 adaptable to receive the report wherein an original image of the web page is cut into parts that correspond to visual elements of the web page are stored in the database. A report analyzer module 210 wherein each of the DOM tree elements with assigned identifier of the cut image is sent for classification to a heuristic ads classifier module 212 and an attribute received from the heuristic ads classifier module 212 is appended to each checked element, whether it is supposedly an advertising or not.

The least one crawler bot 204 also includes a modified Ad blocking browser extension 214 is added thereto. This modified Ad blocking browser extension 214 is configured not to block the advertising found on the web page, but instead configured only to mark the units that would have been blocked, wherein the marks are stored in the nodes of the DOM tree. The report cutter module 208 is configured not to perform pre-filtering in the mode of new advertising search wherein all the units that were contained on the web page pass to the further processing. An AdBlocker metrics module 216 receives information from the report analyzer module 210 and forwards information to an error learning module 218 which in turn forwards information hack to the heuristic ads classifier module 212.

Alluding to the above, the system 100 can operate in two modes: the mode of finding new advertising and generating rules for it and the mode of automatic data collection (datasets). The initial data for the system 100 are the full content of web pages 102, the crawler bot module 104 and the bot server module 106 created to collect the data. The crawler bots 104 is a combination of the computer, a web-browser, and a browser extension and a number of tools for monitoring, managing bots, as well as automatic deployment of this extension. The system 100 simultaneously operates a number of crawler bot entities. The bot server module 106 module is introduced to coordinate their work and to process and store the data that they collect.

The composition of the data collected by the crawler bot module 104 includes a screenshot of the entire web page. It is stored as a normal image format. A copy of the page DOM tree is used. The contents of the main page elements and bound (the size and coordinates of the element on the original page). For the child elements of the DOM tree there are stored related links (url) and html metrics, which potentially can have signs of Internet advertising, as well as the visual dimensions of each element (bound rectangle). The combination of all data collected by the crawler bot module is called a "report".

Then the reports go to the report cutter module 108 where the original image of the web page is cut into parts that correspond to the visual elements of the web page (the cutting is done using the bound rectangle coordinates) and are stored in the database. It should be noted that the cutting is performed not on all elements of the web page, but on those elements that contain at least one external link. The link is called an external one if its domain does not contain the domain name of the site on which it was found. Such pre-filtering was introduced to optimize the speed of the system, since the process of cutting units, storing them and analyzing them is a resource-intensive operation. The report cutter module 108 allows establishing a link between the elements in the DOM tree of the web page: their html content and their visual display on the original web page.

The cut-out image is saved in the database, it is assigned with an identifier (ID_321), after which the data of the cut-out image ID is added to the structure of the DOM tree. Thus, there is a connection between the cut-out element and the DOM tree.

At the report analysis stage that includes the aforementioned report analyzer module 110, each element of the DOM tree that has a visual display. The DOM tree element with the assigned identifier of the cut image, is sent for classification to the heuristic ads classifier module 112 and an attribute (as a response of the module 112) is appended to each checked element, whether it is supposedly an advertising or not.

The reports with pre-marked units, screenshot jpg with the framed graphic elements, which were marked as ads by the system 100 at the previous stages. In this case, when the screenshot element is selected with the mouse, additional attributes of the element appear in the form of html and url, which were defined by the heuristic ads classifier module 112 as advertising, get into the system of human control and error correction through the issue system review module 114 carried out by ads reviewers 116.

The issue system review is a Web interface. The reports with at least one ad unit confirmed by the reviewers 116 get into the stage of ad-blocking rules generation through the issue system and rules generation module 118. At this stage, preliminary lists of rules will be generated for each ad unit of the report, wherein preliminary rule lists are created by the heuristic rules generator module 120 generating a list of rules for each ad unit based on html attributes (id, class, href, src), taking into account the priority order of each attribute.

The preliminary rules are controlled and filtered. The rules generated by the heuristic rules generator module 120 are applied in the StopAd program, and if the generated rules do not work correctly (either the ad units are not removed or the extra units are removed), a reviewer 116 corrects such rules manually so that they work correctly by a reviewer from the rules generation department such as rules reviewers 122. After confirming and compiling the final rule list, all rules fall into the Ad-Blocking rules storage module 124. Once the rules are in the storage, they can be used by any ad-blocker compatible with the rule format.

All units that were erroneously classified by the heuristic ads classifier module 112 after the reviewers' check 114 and 116 get to the error learning module 126. At this stage, data sets will be created, from the data mistakenly classified by the system 100, for further machine learning by these data. That is, such datasets are added to the heuristic ads classifier module 112. Further learning reduces the number of similar errors in the future and reduces the need for human intervention at the error control stage.

The results of the system 100 operation in this mode are the rules created for the advertising found, which can be used by various applications for ad-blocking, as well as new models of heuristic classification that were changed by further learning on the erroneously classified data.

Referring to FIG. 2, the schematic view of the method 200 of the present invention operating in a second mode directed to automatic data collection (datasets) for learning. The system works in the way similar to the system 100 except for a few differences. At the stage of the crawler bots module 204 stage, a modified ad-blocking extension 214 is added, which does not block the advertising found on the web page 202, but only marks the units that would have been blocked. The marks are stored in the nodes of the DOM tree. At the stage of the report cutter module 208 operation, pre-filtering is not performed as in the mode of new advertising search, and all the units that were contained on the web page 202 pass to the further processing. Instead of the system of human control of found advertising and all further modules, the marks of the modified ad-blocking extension module 216 are used as a "teacher". This mode allows fully automatic collection of the marked data (datasets) ready for further learning of the heuristic ads classifier module 112 and 212.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented system for heuristic generation of rules for web-based advertising received from a web in form of full content of web pages, said computer-implemented system configured to automatically finding new web-based advertising and generating rules for the web-based advertising and automatically collecting data, said computer-implemented system comprising:

at least one crawler bot presented a combination of a computer, a web-browser, and a browser extension and tools for monitoring and managing said at least one crawler bots, wherein said browser extension adaptable for automatic deployment, said at least one crawler bot collecting a report including a screenshot of the entire web page stored as a normal image format and a copy of a page of a DOM tree element, including child elements of the DOM tree element with related links (url) and html metrics;

a bot server module for collecting and storing data received from said at least one crawler bot and coordinating functionality of said at least one crawler bot;

a report cutter module adaptable to receive said report wherein an original image of the web page is cut into parts that correspond to visual elements of the web page are stored in a database, a report analyzer module wherein each of said DOM tree elements with assigned identifier of the cut image is sent for classification to a heuristic ads classifier module and an attribute received from said heuristic ads classifier module is appended to each checked element, whether it is supposedly an advertising or not; and said computer-implemented system configured to automatically finding new web-based advertising and generating rules for the web-based advertising and automatically collecting data through a module for issue system review wherein the reports are confirmed and submitted to a module for issue system and rules generation to develop preliminary lists of rules generated for each ad unit of the report, wherein preliminary rule lists are created by a heuristic rules generator module for generating rules for each ad unit based on html attributes including and not limited to id, class, href, src, taking into account the priority order of each said html attributes.

2. The computer-implemented system as set forth in claim 1, including an error learning module interconnecting said module for issue system review and said heuristic ads classifier module.

3. The computer-implemented system as set forth in claim 1, wherein said report cutter module is configured to establish a link between the elements in said DOM tree of the web page with respective html content and visual display on the original web page, wherein cut-out images are saved in said database, and an identifier (ID) is assigned to each of said cut-out images, after which the data of said ID of each of said cut-out images is added to said DOM tree thereby establishing a link between said cut-out image and said DOM tree.

4. The computer-implemented system as set forth in claim 1, wherein said report cutter module is configured to identify elements that contain at least one external link, wherein said one external link includes a domain which does not contain domain name of the site on which it was found.

5. The computer-implemented system as set forth in claim 1, wherein said at least one crawler bot includes a modified ad-blocking extension is added thereto.

6. The computer-implemented system as set forth in claim 5, wherein said modified ad-blocking extension is configured not to block the advertising found on the web page, but instead configured only to mark the units that would have been blocked, wherein the marks are stored in the nodes of said DOM tree.

7. The computer-implemented system as set forth in claim 1, wherein said report cutter module is configured not to perform pre-filtering in the mode of new advertising search wherein all the units that were contained on the web page pass to the further processing.

8. A computer-implemented method for heuristic generation of rules for web-based advertising received from a web in form of full content of web pages, the computer-implemented method configured to automatically find new web-based advertising and generate rules for the web-based advertising and automatically collecting data, the computer-implemented method comprising:
operably connecting at least one crawler bot module with a bot server module and a report cutter module;
operably communicating at least one crawler bot module with a computer, a web-browser, and a browser extension and tools for monitoring and managing said at least one crawler bots, wherein the browser extension adaptable for automatic deployment;
configuring the at least one crawler bot to collect a report including a screenshot of the entire web page stored as a normal image format and a copy of a page of a DOM tree element, including child elements of the DOM tree element with related links (url) and html metrics;
collecting and storing by the bot server module data received from the at least one crawler bot and coordinating functionality of the at least one crawler bot;
receiving by the report cutter module the report wherein an original image of the web page is cut into parts that correspond to visual elements of the web page are stored in the database,
operably connecting a report analyzer module with the report cutter module and a heuristic ads classifier module wherein each of the DOM tree elements with assigned identifier of the cut image is sent for classification to the heuristic ads classifier module and an attribute received from the heuristic ads classifier module is appended to each checked element, whether it is supposedly an advertising or not;
configuring the computer-implemented system to automatically finding new web-based advertising and to generate rules for the web-based advertising and automatically collect data through a module for issue system review wherein the reports are confirmed;
submitting to a module for issue system and rules generation to develop preliminary lists of rules generated for each ad unit of the report, wherein preliminary rule lists are created by a heuristic rules generator module to generate rules for each ad unit based on html attributes including and not limited to id, class, href, src, taking into account the priority order of each the html attributes.

9. The computer-implemented method as set forth in claim 8, including a step of interconnecting an error learning module with the module for issue system review and the heuristic ads classifier module.

10. The computer-implemented method as set forth in claim 8, including a step of configuring the report cutter module to establish a link between the elements in the DOM tree of the web page with respective html content and visual display on the original web page.

11. The computer-implemented method as set forth in claim 10, further including a step of saving cut-out images in the database and assigning an identifier (ID) to each of the cut-out images, after which the data of the ID of each of the cut-out images is added to the DOM tree to establish a link between the cut-out image and the DOM tree.

12. The computer-implemented method as set forth in claim 8, including a step of configuring the report cutter module to identify elements that contain at least one external link, wherein the one external link includes a domain which does not contain domain name of the site on which it was found.

13. The computer-implemented method as set forth in claim 8, including a step of adding to the at least one crawler bot a modified ad-blocking extension.

14. The computer-implemented method as set forth in claim 8, further including a step of configuring the modified Ad blocking browser extension not to block the advertising found on the web page, but instead configuring modified Ad blocking browser extension only to mark the units that would have been blocked, wherein the marks are stored in the nodes of the DOM tree.

15. The computer-implemented method as set forth in claim 8, including a step of configuring the report cutter module not to perform pre-filtering in the mode of new advertising search wherein all the units that were contained on the web page pass to the further processing.

16. A computer-implemented system for heuristic generation of rules for web-based advertising received from a web in form of full content of web pages, said computer-implemented system configured to automatically finding new web-based advertising and generating rules for the web-based advertising and automatically collecting data, said computer-implemented system comprising:
at least one crawler bot presented a combination of a computer, a web-browser, and a browser extension and tools for monitoring and managing said at least one crawler bots, wherein said browser extension adaptable for automatic deployment, said at least one crawler bot collecting a report including a screenshot of the entire web page stored as a normal image format and a copy of a page of a DOM tree element, including child elements of the DOM tree element with related links (url) and html metrics;

a bot server module for collecting and storing data received from said at least one crawler bot and coordinating functionality of said at least one crawler bot;

a report cutter module adaptable to receive said report wherein an original image of the web page is cut into parts that correspond to visual elements of the web page are stored in a database, said report cutter module is configured not to perform pre-filtering in the mode of new advertising search wherein all the units that were contained on the web page pass to the further processing, said report cutter module is configured to identify elements that contain at least one external link, wherein said one external link includes a domain which does not contain domain name of the site on which it was found; said report cutter module is configured to establish a link between the elements in said DOM tree of the web page with respective html content and visual display on the original web page, wherein cut-out images are saved in said database, and an identifier (ID) is assigned to each of said cut-out images, after which the data of said ID of each of said cut-out images is added to said DOM tree thereby establishing a link between said cut-out image and said DOM tree;

a report analyzer module wherein each of said DOM tree elements with assigned identifier of the cut image is sent for classification to a heuristic ads classifier module and an attribute received from said heuristic ads classifier module is appended to each checked element, whether it is supposedly an advertising or not;

said computer-implemented system configured to automatically finding new web-based advertising and generating rules for the web-based advertising and automatically collecting data through a module for issue system review wherein the reports are confirmed and submitted to a module for issue system and rules generation to develop preliminary lists of rules generated for each ad unit of the report, wherein preliminary rule lists are created by a heuristic rules generator module for generating rules for each ad unit based on html attributes including and not limited to id, class, href, src, taking into account the priority order of each said html attributes;

an error learning module interconnecting said module for issue system review and said heuristic ads classifier module; and wherein said at least one crawler bot includes a modified Ad blocking browser extension is added thereto and is configured not to block the advertising found on the web page, but instead configured only to mark the units that would have been blocked, wherein the marks are stored in the nodes of said DOM tree.

* * * * *